United States Patent
Ukai et al.

(10) Patent No.: US 8,202,658 B2
(45) Date of Patent: Jun. 19, 2012

(54) METHOD FOR STOPPING A HYDROGEN GENERATOR BY CONTROLLING WATER SUPPLY TO A REFORMER

(75) Inventors: Kunihiro Ukai, Nara (JP); Yukimune Kani, Osaka (JP)

(73) Assignee: Panasonic Corporation, Osaka (JP)

( * ) Notice: Subject to any disclaimer, the term of this patent is extended or adjusted under 35 U.S.C. 154(b) by 429 days.

(21) Appl. No.: 12/522,101

(22) PCT Filed: Dec. 24, 2008

(86) PCT No.: PCT/JP2008/003916
§ 371 (c)(1),
(2), (4) Date: Jul. 2, 2009

(87) PCT Pub. No.: WO2009/090718
PCT Pub. Date: Jul. 23, 2009

(65) Prior Publication Data
US 2011/0189565 A1    Aug. 4, 2011

(30) Foreign Application Priority Data
Jan. 17, 2008    (JP) .................................. 2008-007696

(51) Int. Cl.
*H01M 8/06* (2006.01)
(52) U.S. Cl. ......... 429/416; 429/417; 429/423; 429/433
(58) Field of Classification Search .................. 429/416, 429/417, 420, 423, 425, 433, 443, 428; 422/187, 422/625, 626
See application file for complete search history.

(56) References Cited

U.S. PATENT DOCUMENTS

| 2004/0037761 A1 | 2/2004 | Maenishi et al. |
| 2007/0006530 A1 | 1/2007 | Maenishi et al. |
| 2007/0101647 A1* | 5/2007 | Miyauchi et al. ............ 48/198.7 |

FOREIGN PATENT DOCUMENTS

| EP | 1 316 529 A1 | 6/2003 |
| EP | 1 411 572 A1 | 4/2004 |

(Continued)

OTHER PUBLICATIONS

European Search Report issued in European Patent Application No. 08870612.2 dated Mar. 19, 2012.

*Primary Examiner* — Raymond Alejandro
(74) *Attorney, Agent, or Firm* — McDermott Will & Emery LLP

(57) ABSTRACT

A hydrogen generator includes: a reformer configured to generate a hydrogen-containing gas by a reforming reaction between a raw material and water; a heater configured to combust at least a part of the hydrogen-containing gas to supply heat necessary for the reforming reaction to the reformer; a combustion detector configured to detect a combustion state of the heater; a raw material supplier configured to supply the raw material; a water supplier configured to supply the water; and an operation controller. When stopping the hydrogen generator, the operation controller causes the raw material supplier to stop operating, the water supplier to stop operating in a case where the combustion detector detects extinction of flame, and the raw material supplier to start operating to supply the raw material to the hydrogen generator in a case where the reforming temperature detector detects a temperature equal to or lower than a reference temperature.

6 Claims, 3 Drawing Sheets

FOREIGN PATENT DOCUMENTS

| | | |
|---|---|---|
| EP | 1 538 126 A1 | 6/2005 |
| JP | 2003-288930 | 10/2003 |
| JP | 2004-307236 | 11/2004 |
| JP | 2005-206395 | 8/2005 |
| JP | 2005-213050 | 8/2005 |
| JP | 2006-008458 | 1/2006 |
| JP | 2007-051063 | 3/2007 |
| JP | 2007-191338 | 8/2007 |

\* cited by examiner

1 HYDROGEN GENERATOR
2 HEATER
3 WATER SUPPLIER
4 RAW MATERIAL SUPPLIER
5 ABSORBENT DESULFURIZER
8 FUEL CELL
9 SEALING DEVICE
10 MATERIAL SUPPLYING PASSAGE
15 COMBUSTION GAS SUPPLYING PASSAGE
16 OPERATION CONTROLLER
18 REFORMING TEMPERATURE DETECTOR
22 COMBUSTION DETECTOR
100 FUEL CELL POWER GENERATING SYSTEM

METHOD FOR STOPPING A HYDROGEN GENERATOR BY CONTROLLING WATER SUPPLY TO A REFORMER

RELATED APPLICATIONS

This application is the U.S. National Phase under 35 U.S.C. §371 of International Application No. PCT/JP2008/003916, filed on Dec. 24, 2008, which in turn claims the benefit of Japanese Application No. 2008-007696, filed on Jan. 17, 2008, the disclosures of which Applications are incorporated by reference herein.

TECHNICAL FIELD

The present invention relates to a hydrogen generator configured to generate a hydrogen-containing gas with a low carbon monoxide concentration from, for example, a fossil material, a fuel cell power generating system including the hydrogen generator, and a method for stopping the hydrogen generator.

BACKGROUND ART

A fuel cell power generating system is a system configured to generate electric power such that a hydrogen-containing gas and an oxygen-containing gas are supplied to a fuel cell stack (hereinafter referred to as "fuel cell") that is a main body of a power generating portion, and a chemical energy generated by an electrochemical reaction between hydrogen and oxygen is utilized as an electric energy. Moreover, the fuel cell power generating system can generate the electric power with high efficiency and easily extract heat energy generated in an electric power generating operation to utilize the heat energy. Therefore, the fuel cell power generating system has been developed as a distributed power generating system capable of realizing high energy use efficiency.

Generally, the hydrogen-containing gas is not supplied from any infrastructure. Therefore, a conventional fuel cell power generating system is provided with a hydrogen generator including a reformer portion configured to generate the hydrogen-containing gas by causing a reforming reaction between steam and a raw material at 600° C. to 700° C. using a Ru catalyst or a Ni catalyst. Here, city gas, LPG, or the like supplied form an existing infrastructure is used as the raw material.

Usually, the hydrogen-containing gas obtained by the reforming reaction contains carbon monoxide derived from the raw material. If the carbon monoxide concentration of the hydrogen-containing gas is high, an electric power generation property of the fuel cell deteriorates. Therefore, in addition to the reformer portion, the hydrogen generator often includes reaction portions, such as a shift converter portion configured to cause a shift reaction between the carbon monoxide and the steam at 200° C. to 350° C. to reduce the carbon monoxide and having a Cu—Zn based catalyst or a precious metal based catalyst, and a selective oxidation portion configured to selectively cause an oxidation reaction of the carbon monoxide at 100° C. to 200° C. to further reduce the carbon monoxide and having a Ru catalyst or a Pt catalyst.

Catalytic activities of the catalysts, such as the Cu—Zn based catalyst, used by the above reaction portions may deteriorate by oxidation. For example, after the hydrogen generator stops operating, the inside of the hydrogen generator may become a reduced pressure state by the temperature decrease and the condensation of the steam, and outside air may be suctioned into the hydrogen generator, so that the catalyst may be exposed to an oxidation atmosphere. To suppress this phenomenon, it is desirable that when stopping the hydrogen generator, an inactive gas, such as nitrogen, be supplied to the hydrogen generator to realize an inactive gas atmosphere. However, as with the hydrogen-containing gas, the inactive gas is not supplied from any infrastructure. Especially, the inactive gas cannot be easily utilized in the distributed power generating system.

Here, to prevent the catalyst from being exposed to the oxidation atmosphere without using the inactive gas, for example, proposed is a configuration in which when stopping the hydrogen generator, an exit valve of the shift converter portion is closed to stop supplying the raw material and water to the reformer portion, and when the reformer portion and the shift converter portion become a predetermined temperature or lower, the exit valve of the shift converter portion open to supply the raw material to the hydrogen generator (see Patent Document 1 for example).

Moreover, proposed is a configuration in which when stopping the hydrogen generator, an output of at least one of a material supplying portion, a water supplying portion, and a combustion air supplying portion is controlled to lower a detected temperature of a reforming temperature measuring portion while continuously supplying the raw material and the water, and in a case where the detected temperature of the reforming temperature measuring portion falls below a predetermined reference temperature, the supply of the raw material and the supply of the water are stopped (see Patent Document 2 for example).

Patent Document 1: Japanese Laid-Open Patent Application Publication 2004-307236

Patent Document 2: Japanese Laid-Open Patent Application Publication 2006-8458

DISCLOSURE OF THE INVENTION

Problems to be Solved by the Invention

However, in the configuration of Patent Document 1, the supply of the raw material and the supply of the water are stopped at high temperature. For example, if water evaporation delays, the pressure inside the hydrogen generator rapidly increases, so that it is necessary to increase the pressure resistance of the hydrogen generator. Moreover, in the configuration of Patent Document 2, the supply of the raw material and the supply of the water are stopped after the temperature is decreased, so that it is unnecessary to increase the pressure resistance of the hydrogen generator. However, since the combustion is continuously carried out, the temperature decrease in the reforming temperature measuring portion delays, and the stop operation of the hydrogen generator is prolonged.

The present invention was made to solve the above conventional problems, and an object of the present invention is to provide a hydrogen generator having a simple configuration and capable of quickly terminating the stop operation, a fuel cell power generating system including the hydrogen generator, and a method for stopping the hydrogen generator.

Means for Solving the Problems

In order to solve the above problems, a hydrogen generator of the present invention includes: a reformer configured to include a reforming catalyst used to generate a hydrogen-containing gas by a reforming reaction between a raw material and water; a reforming temperature detector configured to detect a temperature of the reforming catalyst; a heater configured to combust at least a part of the hydrogen-containing gas to supply heat necessary for the reforming reaction to the reformer; a combustion detector configured to detect a combustion state of the heater; a raw material supplier configured to supply the raw material; a water supplier configured to supply the water; and an operation controller, wherein when stopping the hydrogen generator, the operation controller causes the raw material supplier to stop operating, in a case where the combustion detector detects extinction of flame, the operation controller causes the water supplier to stop operating, and in a case where the reforming temperature detector detects a temperature equal to or lower than a reform replacement reference temperature, the operation controller causes the raw material supplier to start operating to supply the raw material to the hydrogen generator.

Moreover, the hydrogen generator of the present invention may further include: a hydrogen-containing gas supplying passage through which the hydrogen-containing gas is supplied from the hydrogen generator to an outside of the hydrogen generator; and a sealing device configured to seal the hydrogen-containing gas supplying passage, wherein when stopping the hydrogen generator, the operation controller may cause the raw material supplier to stop operating, in a case where the combustion detector detects the extinction of flame, the operation controller may cause the water supplier to stop operating and activates the sealing device to seal the hydrogen-containing gas supplying passage, and in a case where the reforming temperature detector detects the temperature equal to or lower than the reform replacement reference temperature, the operation controller may activate the sealing device to open the hydrogen-containing gas supplying passage, and then, cause the raw material supplier to start operating to supply the raw material to the hydrogen generator.

Moreover, in the hydrogen generator of the present invention, when stopping the hydrogen generator, the operation controller may cause the raw material supplier to stop operating, in a case where the combustion detector detects the extinction of flame, the operation controller may cause the water supplier to stop operating and cause the raw material supplier to start operating to supply the raw material to the hydrogen generator, the operation controller may activate the sealing device to seal the hydrogen-containing gas supplying passage and cause the raw material supplier to stop operating, and in a case where the reforming temperature detector detects the temperature equal to or lower than the reform replacement reference temperature, the operation controller may activate the sealing device to open the hydrogen-containing gas supplying passage and cause the raw material supplier to start operating to supply the raw material to the hydrogen generator.

Moreover, in the hydrogen generator of the present invention, the reform replacement reference temperature may be predetermined based on a temperature at which deposition of carbon from the raw material on the reforming catalyst does not occur.

Further, in the hydrogen generator of the present invention, the reforming catalyst may be a catalyst containing Ni.

Moreover, a fuel cell power generating system of the present invention includes: the hydrogen generator; and a fuel cell configured to use as a fuel the hydrogen-containing gas discharged from the hydrogen generator.

Moreover, a method for stopping a hydrogen generator according to the present invention is a method for stopping a hydrogen generator including: a reformer configured to generate a hydrogen-containing gas by a reforming reaction between a raw material and water, and include a reforming catalyst; a reforming temperature detector configured to detect a temperature of the reforming catalyst; a heater configured to combust at least a part of the hydrogen-containing gas to supply heat necessary for the reforming reaction to the reformer; a combustion detector configured to detect a combustion state of the heater; a raw material supplier configured to supply the raw material; a water supplier configured to supply the water; and an operation controller, and the method includes the steps of: (a) stopping supplying the raw material to the reformer; (b) stopping supplying the water to the reformer in a case where the combustion detector detects extinction of flame; (c) activating the sealing device to seal the hydrogen-containing gas supplying passage; (d) activating the sealing device to open the hydrogen-containing gas supplying passage in a case where the reforming temperature detector detects a temperature equal to or lower than a reform replacement reference temperature; and (e) causing the raw material supplier to start operating to supply the raw material to the reformer.

Further, in the method for stopping the hydrogen generator of the present invention, the step (b) may include the steps of: (b1) stopping supplying the water to the reformer in a case where the combustion detector detects the extinction of flame; (b2) causing the raw material supplier to start operating to start supplying the raw material to the reformer; and (b3) causing the raw material supplier to stop operating to stop supplying the raw material to the reformer.

The above object, other objects, features and advantages of the present invention will be made clear by the following detailed explanation of preferred embodiments with reference to the attached drawings.

Effects of the Invention

In accordance with the hydrogen generator of the present invention, the fuel cell power generating system including the hydrogen generator, and the method for stopping the hydrogen generator, the temperature of the reformer is quickly decreased by the water evaporation when stopping the hydrogen generator, so that the stop operation of the hydrogen generator can be quickly terminated while suppressing rapid pressure increase in the hydrogen generator. Moreover, the operation of the raw material supplier is stopped, but the operation of the water supplier is continued to generate the steam, so that while causing a replacement reaction for replacing the hydrogen-containing gas in the hydrogen generator with the steam, the combustion state of the heater can be detected to recognize a replacement state of the hydrogen-containing gas. Further, the hydrogen generator can be stopped without using the inactive gas, such as nitrogen. In addition, the fuel cell power generating system can be easily operated even at a place where the infrastructure of the inactive gas, such as the nitrogen gas, is not built.

Figure 1:
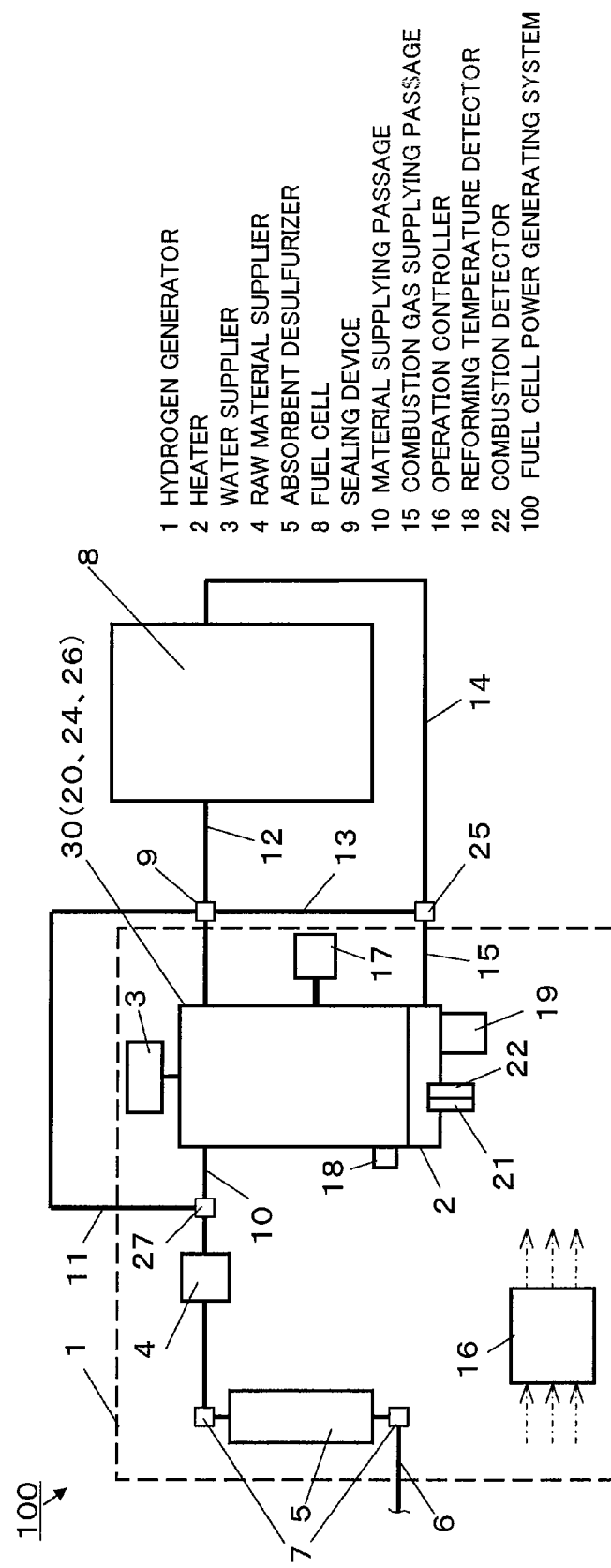
FIG. 1 is a schematic diagram showing a fuel cell power generating system in Embodiment 1 of the present invention.

EXPLANATION OF REFERENCE NUMBERS 1 hydrogen generator
2 heater 3 water supplier
4 raw material supplier
5 absorbent desulfurizer
6 gas infrastructure line
7 adsorptive desulfurization connector
8 fuel cell
9 sealing device
10 material supplying passage
11 hydrogen generator bypass passage
12 hydrogen-containing gas supplying passage
13 fuel cell bypass passage
14 off gas passage
15 combustion gas supplying passage
16 operation controller
17 air supplier
18 reforming temperature detector
19 combustion fan
20 steam reformer
21 ignitor
22 combustion detector
24 shift converter
25, 27 connector
26 selective oxidizer
30 hydrogen generator main body
100, 200 fuel cell power generating system

BEST MODE FOR CARRYING OUT THE INVENTION

Hereinafter, embodiments of the present invention will be explained in reference to the drawings.

Embodiment 1

Configuration of Fuel Cell Power Generating System

FIG. 1 is a schematic diagram showing a fuel cell power generating system 100 in Embodiment 1 of the present invention. As shown in FIG. 1, the fuel cell power generating system 100 in Embodiment 1 includes: a hydrogen generator 1 configured to generate a hydrogen-containing gas; a fuel cell 8 configured to generate electric power using the hydrogen-containing gas supplied from the hydrogen generator 1; a hydrogen-containing gas supplying passage 12 through which the hydrogen-containing gas is supplied from the hydrogen generator 1 to the fuel cell 8; an off gas passage 14 through which a hydrogen off gas discharged from the fuel cell 8 is introduced to the hydrogen generator 1; and a combustion gas supplying passage 15 through which a combustion gas is supplied to the hydrogen generator 1.

A sealing device 9 configured to stop the supply of the hydrogen-containing gas from the hydrogen generator 1 is provided on the hydrogen-containing gas supplying passage 12. Moreover, a hydrogen generator bypass passage 11 through which the raw material supplied to the hydrogen generator 1 is introduced to an outside of the hydrogen generator 1 before the raw material is used, and a fuel cell bypass passage 13 through which the hydrogen-containing gas supplied from the hydrogen generator 1 returns to the hydrogen generator 1 without being supplied to the fuel cell 8 are connected to the sealing device 9. The fuel cell bypass passage 13, the off gas passage 14, and the combustion gas supplying passage 15 are connected to one another via a connector 25 constituted by, for example, a three-way valve.

The sealing device 9 is configured by a combination of a three-way valve and a plurality of solenoid valves (a detailed explanation thereof is omitted), and functions to seal and open the hydrogen-containing gas supplying passage 12 and to switch the flow of the gas supplied from the hydrogen generator 1 through the hydrogen generator bypass passage 11 and the hydrogen-containing gas supplying passage 12.

In Embodiment 1, a general polymer electrolyte fuel cell is used as the fuel cell 8, and a detailed explanation thereof is omitted. Moreover, the fuel cell 8 is not limited to the polymer electrolyte fuel cell, and various fuel cells can be used.

Hereinafter, a specific configuration of the hydrogen generator 1 in Embodiment 1 will be explained.

Configuration of Hydrogen Generator

As shown in FIG. 1, the hydrogen generator 1 in Embodiment 1 includes a water supplier 3, a raw material supplier 4, an absorbent desulfurizer 5, a hydrogen generator main body 30, and an operation controller 16.

The water supplier 3 is a water pump which is connected to the hydrogen generator main body 30 outside the hydrogen generator main body 30 and has a flow rate adjustment function. The water supplier 3 supplies water to the hydrogen generator main body 30 while adjusting the flow rate of the water based on a command from the operation controller 16. In Embodiment 1, the water supplier 3 is constituted by the water pump having the flow rate adjustment function. However, the present embodiment is not limited to this, and the flow rate may be adjusted by a combination of a pump and a flow rate control valve.

The raw material supplier 4 is a booster pump having the flow rate adjustment function and disposed on a material supplying passage 10 which connects the absorbent desulfurizer 5 and the hydrogen generator main body 30. The raw material supplier 4 supplies the raw material to the hydrogen generator main body 30 while adjusting the flow rate of the raw material based on the command from the operation controller 16. The hydrogen generator bypass passage 11 is connected via a connector 27 constituted by, for example, a three-way valve to a portion of the material supplying passage 10 which portion is located downstream of the raw material supplier 4.

The absorbent desulfurizer 5 is filled with a zeolite-based adsorptive remover which adsorbs a sulfur compound that is an odorant component in the raw material. When a hydrocarbon-based raw material containing a sulfur constituent flows through the absorbent desulfurizer 5, the absorbent desulfurizer 5 adsorbs the sulfur constituent contained in the raw material. The hydrocarbon-based raw material is a raw material containing an organic compound, such as hydrocarbon, constituted by at least carbon and hydrogen atoms. Examples of the hydrocarbon-based raw material are a city gas (13A, etc.) containing methane as a major component, a natural gas, and an LPG. In Embodiment 1, a gas infrastructure line 6 of the city gas is used as a supply source of the raw material. The gas infrastructure line 6 is connected to the absorbent desulfurizer 5. The flow rate of the raw material supplied from the gas infrastructure line 6 is controlled by a raw material flow rate adjustment of the raw material supplier 4 such that the raw material, the amount of which is appropriate for a predetermined amount of the hydrogen-containing gas necessary in the fuel cell 8, is supplied to the absorbent desulfurizer 5. In Embodiment 1, the absorbent desulfurizer 5 is provided between the gas infrastructure line 6 and the raw material supplier 4. However, the present embodiment is not limited to this, and the absorbent desulfurizer 5 may be provided downstream of the raw material supplier 4.

Adsorptive desulfurization connectors 7 are respectively provided upstream and downstream of the absorbent desulfurizer 5. The absorbent desulfurizer 5 is configured to be attachable to and detachable from the adsorptive desulfurization connector 7 such that in a case where the amount of adsorption of the absorbent desulfurizer 5 with respect to the sulfur constituent is saturated after a predetermined time of use, and this deteriorates an adsorption characteristic of the absorbent desulfurizer 5, the absorbent desulfurizer 5 can be replaced with a new one. The adsorptive desulfurization connector 7 has a valve function to control the flow of the raw material and, for example, is configured to include a solenoid valve.

The hydrogen generator main body 30 includes: a reformer 20 configured to cause a reforming reaction between the raw material and steam to generate the hydrogen-containing gas; a shift converter 24 configured to cause a shift reaction between carbon monoxide in the hydrogen-containing gas generated by the reformer 20 and the steam to reduce a carbon monoxide concentration of the hydrogen-containing gas; an air supplier 17 configured to supply air to the hydrogen-containing gas having flown through the shift converter 24; and a selective oxidizer 26 configured to remove the carbon monoxide remaining in the hydrogen-containing gas having flown through the shift converter 24, mainly by oxidation using the air supplied from the air supplier 17. A reforming temperature detector 18 configured to detect the temperature of a reforming catalyst (or the hydrogen-containing gas) in the reformer 20 is provided outside the hydrogen generator main body 30. A heater 2 configured to combust the combustion gas to supply reaction heat necessary for the reforming reaction in the reformer 20 is provided at a bottom portion of the hydrogen generator main body 30. The hydrogen generator main body 30 generates the hydrogen-containing gas using the raw material having flown through the absorbent desulfurizer 5 and the water supplied from the water supplier 3.

In Embodiment 1, a Ru-based reforming catalyst is included inside the reformer 20, a Cu—Zn-based shift catalyst is included inside the shift converter 24, and a Ru-based selective oxidation catalyst is included in the selective oxidizer 26. The configurations of the reformer 20, the shift converter 24, and the selective oxidizer 26 are the same as the configurations of those in a general hydrogen generator main body, so that detailed explanations thereof are omitted.

The heater 2 includes: an ignitor 21 that is an ignition source of the heater 2; a combustion detector 22 constituted by a flame rod configured to detect a combustion state of the heater 2, and a combustion fan 19 configured to supply combustion air to the heater 2. In Embodiment 1, a burner is used as the heater 2. The combustion gas to be combusted in the heater 2 is supplied through the combustion gas supplying passage 15 to the heater 2. The flame rod is a device configured to apply a voltage to a flame and measure, as an ion current, ions which move when the voltage is applied to the flame.

The operation controller 16 is a control unit configured to control a drive operation of the hydrogen-containing gas of the hydrogen generator 1. To be specific, the operation controller 16 can store drive information, such as a drive operation sequence of the hydrogen generator 1 and a raw material cumulated flow rate, by a semiconductor memory, a CPU, and the like, calculate an appropriate operating condition depending on situations, and instruct an operating condition to the water supplier 3, the raw material supplier 4, and the like. For example, the operation controller 16 controls a current pulse, an electric power, and the like input to the water supplier 3 and the raw material supplier 4 to control the amount of raw material supplied from the raw material supplier 4 to the hydrogen generator main body 30, the amount of water supplied from the water supplier 3 to the hydrogen generator main body 30, and the operations of the adsorptive desulfurization connector 7 and the sealing device 9. Moreover, based on the intensity of the ion current measured by the combustion detector 22, the operation controller 16 causes the combustion detector 22 to determine whether or not the flame has gone out, i.e., to determine the combustion state of the heater 2. For example, the operation controller 16 determines that the flame of the heater 2 has gone out if the ion current is not detected. The decrease in the ion current in the combustion detector 22 means that the ions in the flame are decreasing. Therefore, if the ion current falls below a predetermined value, the operation controller 16 can determine that the combustion state is shifting to an extinction state and that the flame of the heater 2 has gone out. Further, the operation controller 16 controls the drive operation of the entire fuel cell power generating system 100, such as the fuel cell 8 (a detailed explanation of the operation is omitted).

Here, in the present specification, the operation controller denotes not only a single controller but also a group of controllers configured to control the fuel cell power generating system in cooperation with one another. Therefore, the operation controller 16 does not have to be constituted by a single controller, but may be configured such that a plurality of controllers are dispersively arranged to control the fuel cell power generating system 100 in cooperation with one another.

Start-Up and Normal Drive Operations of Fuel Cell Power Generating System

Start-up and normal drive operations of the fuel cell power generating system 100 of Embodiment 1 will be explained.

The fuel cell power generating system 100 in Embodiment 1 uses as the raw material the city gas (13A) containing methane as the major component. The amount of water supplied from the water supplier 3 is controlled such that the steam is about 3 moles when the number of the carbon atoms in an average molecular formula of the city gas is 1 mole (a steam carbon ratio (S/C) is about 3).

By the command from the operation controller 16, the raw material supplier 4 is activated, and the connector 27 allows the raw material to flow through the hydrogen generator bypass passage 11. At this time, the sealing device 9 connected to the hydrogen generator bypass passage 11 is controlled such that the raw material flowing through the hydrogen generator bypass passage 11 flows through the fuel cell bypass passage 13. Moreover, the connector 25 is controlled such that the raw material flowing through the fuel cell bypass passage 13 flows through the fuel gas supplying passage 15. Therefore, the raw material supplied from the raw material supplier 4 flows through the connector 25 and the combustion gas supplying passage 15 to the heater 2.

The heater 2 ignites the raw material by the ignitor 21 to start heating the hydrogen generator main body 30. Then, the operation controller 16 causes the connector 27 to supply the raw material through the material supplying passage 10 to the hydrogen generator main body 30 and also causes the water supplier 3 to supply the water to the hydrogen generator main body 30, thereby causing the reforming reaction between the water and the raw material to start.

The reformer 20 in the hydrogen generator main body 30 carries out a steam-reforming reaction between the reforming catalyst and a mixture of the heated raw material and the steam. The shift converter 24 carries out the shift reaction among the carbon monoxide and the steam in the hydrogen-containing gas generated by the reformer 20, and the shift catalyst to reduce the carbon monoxide concentration of the hydrogen-containing gas. The selective oxidizer 26 carries out a selective oxidation reaction for the carbon monoxide between the hydrogen-containing gas having flown through the shift converter 24 and the air supplied from the air supplier 17 to further reduce the carbon monoxide concentration of the hydrogen-containing gas. At this time, a combustion operation of the heater 2, i.e., the amount of raw material supplied is controlled based on the temperature detected by the reforming temperature detector 18 such that the temperatures of the reformer 20, the shift converter 24, and the selective oxidizer 26 become suitable for respective reactions.

In the fuel cell power generating system 100 of Embodiment 1, the operation controller 16 controls the sealing device 9 such that until the carbon monoxide concentration of the hydrogen-containing gas generated by the hydrogen generator main body 30 is reduced to a predetermined concentration (for example, 20 ppm (dry gas base)), the hydrogen-containing gas discharged from the hydrogen generator main body 30 to the outside flows through the fuel cell bypass passage 13, the connector 25, and the combustion gas supplying passage 15 to the heater 2.

When the combustion state of the heater 2 becomes stable by the combustion of the hydrogen-containing gas, and the carbon monoxide concentration of the hydrogen-containing gas is reduced to a predetermined concentration, the operation controller 16 causes the sealing device 9 to operate. With this, the supply of the raw material through the hydrogen generator bypass passage 11 to the heater 2 stops, and the hydrogen-containing gas discharged from the hydrogen generator main body 30 is supplied as the fuel gas through the hydrogen-containing gas supplying passage 12 to the fuel cell 8.

The fuel gas supplied to the fuel cell 8 and the oxidizing gas supplied separately from the fuel gas are respectively supplied to an anode and a cathode of each cell, and electrochemically react with each other to generate water, electricity, and heat. Then, an excess fuel gas unconsumed in the fuel cell 8 is supplied as an off gas to the off gas passage 14. The off gas supplied to the off gas passage 14 is supplied through the off gas passage 14 and the combustion gas supplying passage 15 to the heater 2.

Stop Drive Operation of Fuel Cell Power Generating System

A stop drive operation of the fuel cell power generating system 100 of Embodiment 1 will be explained.

Figure 2:
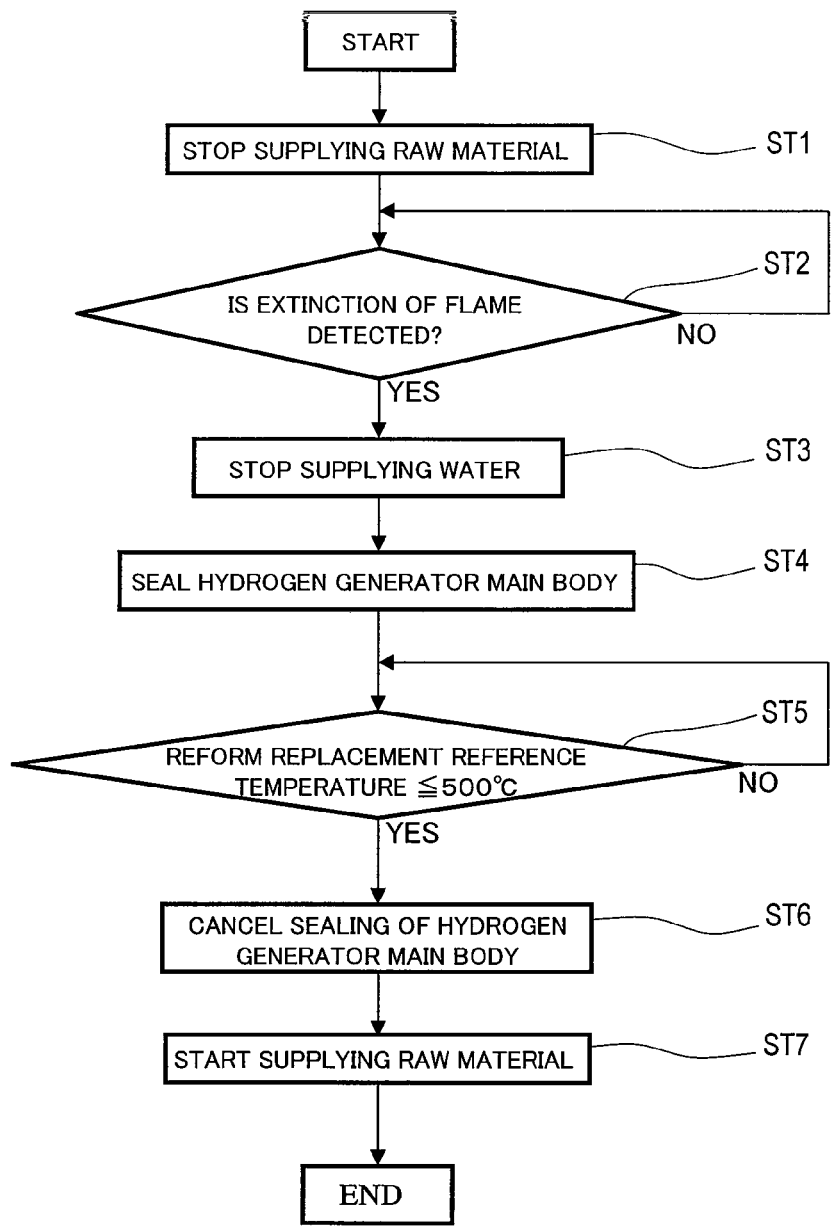
FIG. 2 is a flow chart showing a stop operation of a hydrogen generator in Embodiment 1 of the present invention.

By the command from the operation controller 16, the sealing device 9 is activated to be communicated with the fuel cell bypass passage 13, so that the hydrogen-containing gas which has been supplied from the hydrogen generator main body 30 to the fuel cell 8 is directly supplied through the connector 25 and the combustion gas supplying passage 15 to the heater 2. Then, the process proceeds to the stop operation, shown by the flow chart of FIG. 2, of the hydrogen generator 1 of Embodiment 1. FIG. 2 is a flow chart showing the stop operation of the hydrogen generator in Embodiment 1 of the present invention.

(a) Step of Stopping Supplying Raw Material to Hydrogen Generator Main Body 30

As shown in FIG. 2, in Step 1 (ST1), the raw material supplier 4 stops operating to stop supplying the raw material to the hydrogen generator main body 30. Even after the supply of the raw material stops, the water is continuously supplied by the water supplier 3 to the hydrogen generator main body 30. Therefore, the steam is generated in the hydrogen generator main body 30, and the replacement reaction is caused by the steam with respect to the raw material and the carbon monoxide in the hydrogen-containing gas remaining in a gas passage in the hydrogen generator main body 30. Even when the replaced hydrogen-containing gas is discharged from the hydrogen generator main body 30, it is again supplied to the heater 2. Therefore, even immediately after the stop of the operation of the raw material supplier 4, the combustion in the heater 2 continues. However, in the hydrogen generator main body 30, when the water supply continues, the replacement reaction by the steam with respect to the hydrogen-containing gas is repeated. In addition, since the supply of the raw material from the raw material supplier 4 is stopped, a hydrogen concentration (combustible gas concentration) of the hydrogen-containing gas flowing from the hydrogen generator main body 30 to the heater 2 lowers, and the amount of combustion in the heater 2 also lowers.

As above, in the hydrogen generator 1 of Embodiment 1, the temperature in the reformer 20 can be quickly decreased by the evaporation of the water in the hydrogen generator main body 30 and the decrease in the amount of combustion in the heater 2. Moreover, in the hydrogen generator 1 of Embodiment 1, the rapid increase in the pressure inside the hydrogen generator 1 is suppressed by supplying to the heater 2 the hydrogen-containing gas remaining in the gas passage in the hydrogen generator main body 30.

When stopping the operation of the raw material supplier 4, it is preferable to suppress the flow of the steam back to the absorbent desulfurizer 5 by closing the adsorptive desulfurization connector 7 provided downstream of the absorbent desulfurizer 5 to seal the passage between the absorbent desulfurizer 5 and the hydrogen generator main body 30.

(b) Step of Detecting Extinction of Flame by Combustion Detector 22 and Stopping Supplying Water to Hydrogen Generator Main Body 30

In Step 1 (ST1), the supply of the water from the water supplier 3 continues, and the replacement reaction by the steam is repeated. Therefore, the steam-rich hydrogen-containing gas flows to the heater 2. On this account, it becomes difficult to continue the combustion in the heater 2, and the flame finally goes out.

In Step 2 (ST2), if the ion current is not detected by the combustion detector 22 (YES in ST2), the operation controller 16 determines that the extinction of flame in the heater 2 is completed. Then, in Step 3 (ST3), the operation controller 16 causes the water supplier 3 to stop operating to stop supplying the water to the hydrogen generator main body 30. Herein, the extinction of flame in the heater 2 is determined when the current is not detected by the combustion detector 22. However, the present embodiment is not limited to this. The amount of combustible gas decreases by the increase of the steam in the hydrogen-containing gas, and thus the current detected by the combustion detector 22 decreases. Therefore, the operation controller 16 may determine that the extinction of flame in the heater 2 is completed in a case where the current detected by the combustion detector 22 is a predetermined threshold or lower.

As above, in the hydrogen generator 1 in Embodiment 1, whether or not the hydrogen-containing gas in the hydrogen generator main body 30 is adequately replaced (purged) with the steam can be determined by detecting the combustion state of the heater 2 using the combustion detector 22. Moreover, in a state where the temperature of the reformer 20 is decreased in Step 1 (ST1), the supply of the water is stopped in Step 2 (ST2). Therefore, as compared to a conventional method (for example, a hydrogen producing system and methods for starting and stopping the system disclosed in Patent Document 1) for stopping the supply of the raw material and the supply of the water at the same time and sealing the gas in the hydrogen producing system, the evaporation of the water and the superheat of the steam are suppressed, and destabilization of a pressure state in the hydrogen generator 1 can be suppressed. Moreover, in Embodiment 1, the operation controller 16 causes the water supplier 3 to stop supplying the water immediately after the extinction of flame in the heater 2 is detected by the combustion detector 22. However, the present embodiment is not limited to this. To more surely replace (purge) the hydrogen-containing gas in the hydrogen generator main body 30 with the steam, the operation controller 16 may cause the water supplier 3 to stop supplying the water after a delay time of about several seconds to several tens of seconds set after the extinction of flame in the heater 2 is detected by the combustion detector 22.

(c) Step of Activating Sealing Device 9 to Seal Hydrogen-Containing Gas Supplying Passage 12

In Step 4 (ST4), the operation controller 16 activates the sealing device 9 to seal the hydrogen-containing gas supplying passage 12. Here, the phrase "seal the hydrogen-containing gas supplying passage 12" denotes that a gas discharging passage to the hydrogen generator main body 30 is sealed to prevent the outside air from being suctioned through the hydrogen-containing gas supplying passage 12 and the fuel cell bypass passage 13 to the hydrogen generator main body 30. Although the sealing device 9 is activated immediately after the supply of the water to the hydrogen generator main body 30 is stopped, it may be activated to supply the gas to the hydrogen generator main body 30 when a pressure detector configured to detect the pressure inside the hydrogen generator main body 30 has detected a predetermined value (negative pressure for example).

(d) Step of, When Reforming Temperature Detector 18 Detects Temperature Equal to or Lower Than Reform Replacement Reference Temperature, Activating Sealing Device 9 to Open Hydrogen-Containing Gas Supplying Passage 12

When the reforming temperature detector 18 detects a temperature equal to or lower than a reform replacement reference temperature (500° C.) in Step 5 (ST5) (YES in ST5), the operation controller 16 shifts to Step 6 (ST6) and activates the sealing device 9 to open the hydrogen-containing gas supplying passage 12, thereby canceling the sealing of the hydrogen generator main body 30.

Here, the reform replacement reference temperature is a temperature at which "the deposition of carbon on the reforming catalyst exceeds an allowable level" in a case where only the raw material is supplied to the hydrogen generator main body 30. The reform replacement reference temperature is predetermined based on a temperature at which the deposition of carbon on the reforming catalyst does not occur. Note that "a temperature at which the deposition of carbon exceeds an allowable level" may be a temperature at which the deposition of carbon starts being observed or a temperature at which the amount of the deposition of carbon reaches a certain amount after the deposition of carbon starts being observed.

(e) Step of Supplying Raw Material to Hydrogen Generator Main Body 30

In Step 7 (ST7), the raw material supplier 4 starts operating to supply the raw material to the hydrogen generator main body 30. It is preferable that the amount of raw material supplied be equal to or more than an amount capable of causing the replacement reaction of the steam-rich hydrogen-containing gas in the hydrogen generator main body 30. In the case of supplying an amount equal to or more than the amount capable of causing the replacement reaction, the gas on an exit side of the hydrogen generator main body 30 to which the raw material is being supplied may be supplied to the heater 2, and may be combusted in the heater 2.

It is preferable that even after Step 7 (ST7), a pressure compensating operation be carried out to prevent the outside air from getting mixed in the hydrogen generator main body 30.

Operational Advantage of Fuel Cell Power Generating System (Hydrogen Generator)

When stopping the conventional hydrogen generator, the hydrogen generator is cooled down to a normal temperature if the hydrogen generator is not started up again. In a case where the gas in the hydrogen generator main body is the steam-rich hydrogen-containing gas, the steam may condense in the reformer, and this may deteriorate the catalytic activities of the reforming catalyst, the shift catalyst, and the selective oxidation catalyst (the catalysts may deteriorate).

However, in the hydrogen generator 1 of Embodiment 1 and the fuel cell power generating system 100 including the hydrogen generator 1, as described above, since the steam-rich hydrogen-containing gas is replaced with the raw material, the deterioration of the catalyst can be suppressed.

Moreover, in the hydrogen generator 1 of Embodiment 1 and the fuel cell power generating system 100 including the hydrogen generator 1, when stopping the hydrogen generator 1, the water is supplied from the water supplier 3 to the hydrogen generator main body 30. With this, the temperature of the hydrogen generator main body 30 quickly decreases by the evaporation of the water, so that the stop operation of the hydrogen generator 1 can be quickly terminated. Further, by supplying to the heater 2 the hydrogen-containing gas remaining in the gas passage in the hydrogen generator main body 30, steep pressure increase in the hydrogen generator main body 30 can be suppressed.

Embodiment 2

A fuel cell power generating system 200 in Embodiment 2 of the present invention will be explained. The fuel cell power generating system 200 in Embodiment 2 of the present invention is different from the fuel cell power generating system 100 in Embodiment 1 in that the reformer 20 includes a Ni-based reforming catalyst. The components other than the reformer 20 are substantially the same as those in Embodiment 1, so that detailed explanations thereof are omitted.

Start-Up and Normal Drive Operations of Fuel Cell Power Generating System

The start-up and normal drive operations of the fuel cell power generating system 200 in Embodiment 2 are the same as those in Embodiment 1, so that explanations thereof are omitted.

Stop Drive Operation of Fuel Cell Power Generating System 200

The stop drive operation of the fuel cell power generating system 200 in Embodiment 2 will be explained.

Figure 3:
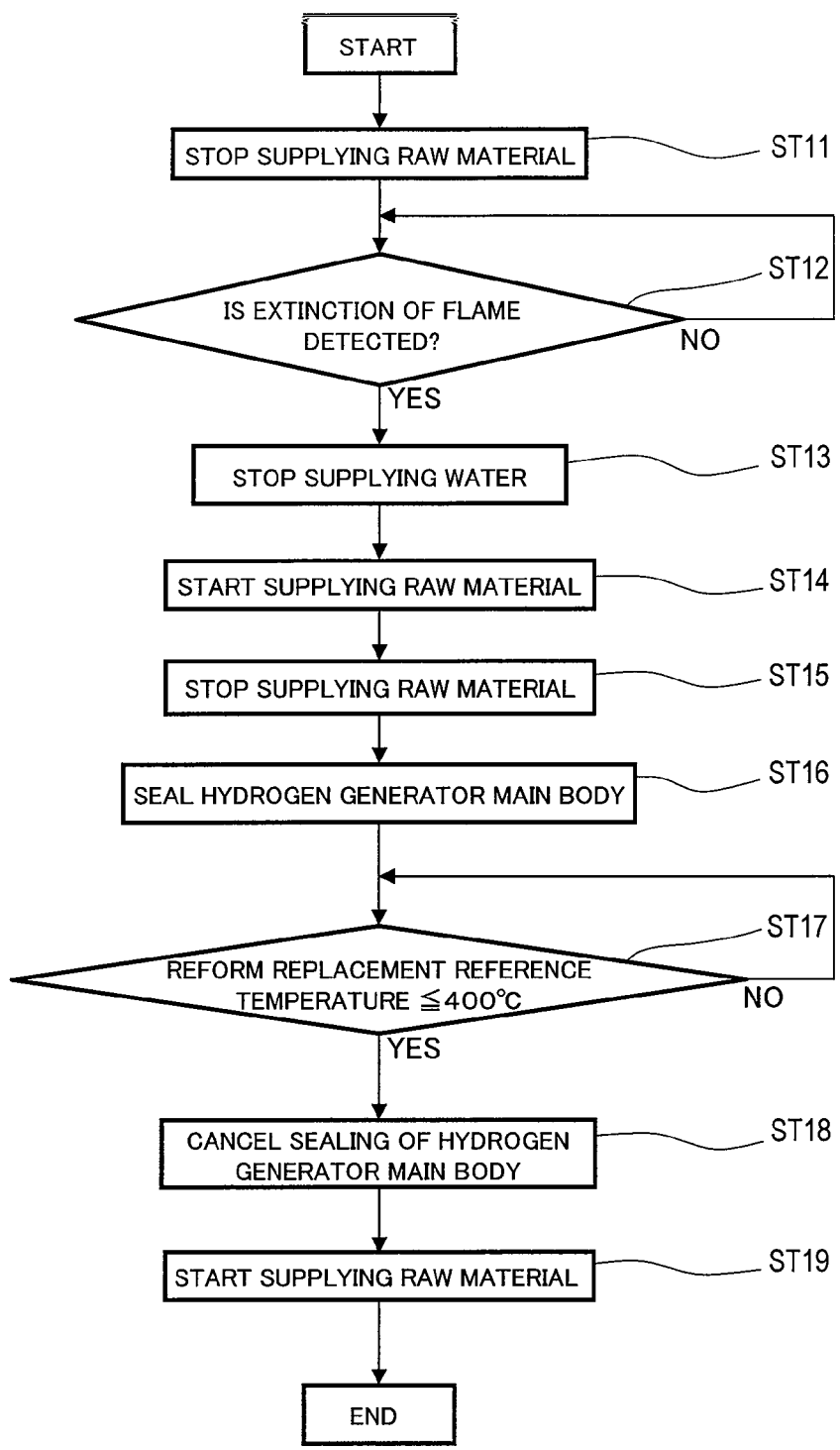
FIG. 3 is a flow chart showing the stop operation of the hydrogen generator in Embodiment 2 of the present invention.

As with Embodiment 1, by the command from the operation controller 16, the sealing device 9 is activated to be communicated with the fuel cell bypass passage 13, so that the hydrogen-containing gas which has been supplied from the hydrogen generator main body 30 to the fuel cell 8 is directly supplied through the connector 25 and the combustion gas supplying passage 15 to the heater 2. Then, the process proceeds to the stop operation, shown by the flow chart of FIG. 3, of the hydrogen generator 1 of Embodiment 2. FIG. 3 is a flow chart showing the stop operation of the hydrogen generator 1 in Embodiment 2 of the present invention.

(a) Step of Stopping Supplying Raw Material to Hydrogen Generator Main Body 30

Since Step 11 (ST11) corresponds to Step 1 (ST1) of Embodiment 1, an explanation thereof is omitted.

(b1) Step of Stopping Supplying Water to Hydrogen Generator Main Body 30 When Combustion Detector 22 Detects Extinction of Flame Since Steps 12 (ST12) and 13 (ST13) correspond to Steps 2 (ST2) and 3 (ST3) in Embodiment 1, explanations thereof are omitted.

(b2) Step of Starting Supplying Raw Material to Hydrogen Generator Main Body 30

In a case where almost 100% of the atmosphere in the hydrogen generator main body 30 is replaced with the steam through Step 11 (ST11), the reforming catalyst, the shift catalyst, and the selective oxidation catalyst may be oxidized by the steam, and the catalytic activities thereof may deteriorate. In Step 14 (ST14), the raw material supplier 4 starts operating to supply a predetermined amount of the raw material to the hydrogen generator main body 30. By the reaction with the steam in the hydrogen generator main body 30, the hydrogen can be generated to suppress the oxidation by the steam. To suppress the oxidation of the catalyst by the steam, the amount of raw material supplied may be an amount capable of at least generating the hydrogen by the reaction with the steam in the hydrogen generator main body 30, and almost 100% of the atmosphere in the hydrogen generator main body 30 may be the raw material. Moreover, it is preferable that the amount of raw material supplied in the hydrogen generator main body 30 be set such that the amount of hydrogen generated is equal to or smaller than a hydrogen combustible range, since the inside of the hydrogen generator main body 30 is high in temperature.

(b3) Step of Stopping Supplying Raw Material to Hydrogen Generator Main Body 30

After a predetermined amount of the raw material is supplied, the operation controller 16 causes the raw material supplier 4 to stop operating in Step 15 (ST15) to stop supplying the raw material to the hydrogen generator main body 30.

(c) Step of Activating Sealing Device 9 to Seal Hydrogen-Containing Gas Supplying Passage 12

Since Step 16 (ST16) corresponds to Step 4 (ST4) in Embodiment 1, an explanation thereof is omitted.

(d) Step of, When Reforming Temperature Detector 18 Detects Temperature Equal to or Lower Than Reform Replacement Reference Temperature, Activating Sealing Device 9 to Open Hydrogen-Containing Gas Supplying Passage 12

When the reforming temperature detector 18 detects a temperature equal to or lower than a reform replacement reference temperature (400° C.) in Step 17 (ST17) (YES in ST17), the operation controller 16 shifts to Step 18 (ST18) and activates the sealing device 9 to open the hydrogen-containing gas supplying passage 12, thereby canceling the sealing of the hydrogen generator main body 30.

In Embodiment 2, the reform replacement reference temperature is set to 400° C. This is because it is preferable that the reform replacement reference temperature of the Ni-based reforming catalyst be set to be lower than that of the Ru-based reforming catalyst since the Ni-based reforming catalyst causes the carbon deposition at low temperature as compared to the Ru-based reforming catalyst, i.e., the temperature at which the carbon deposition exceeds the allowable level is low.

(e) Step of Supplying Raw Material to Hydrogen Generator Main Body 30

Since Step 19 (ST19) corresponds to Step 7 (ST7) of Embodiment 1, an explanation thereof is omitted.

The hydrogen generator 1 in Embodiment 2 configured as above and the fuel cell power generating system 200 including the hydrogen generator 1 have the same operational advantages as the hydrogen generator 1 in Embodiment 1 and the fuel cell power generating system 100 including the hydrogen generator 1. Moreover, in the hydrogen generator 1 in Embodiment 2 and the fuel cell power generating system 200 including the hydrogen generator 1, a predetermined amount of the raw material is supplied to the hydrogen generator main body 30 in a period from when the atmosphere in the hydrogen generator main body 30 is replaced with the steam to when the reforming temperature detector 18 detects the temperature equal to or lower than the reform replacement reference temperature. With this, the oxidation of the catalyst by the steam can be suppressed.

Embodiments 1 and 2 have mainly explained the stop operation of the hydrogen generator 1. However, when stopping the fuel cell power generating system 100, for example, steps not directly related to the hydrogen generator 1, such as a step of replacing the atmosphere in an electrode passage in the fuel cell 8 with the raw material, may be executed during the steps of the stop operation of the hydrogen generator 1. Even in this case, as long as at least the flow of the stop operation of the hydrogen generator 1 explained in Embodiments 1 and 2 is executed, the stop operation of the hydrogen generator 1 can be quickly terminated while suppressing the decrease in the activities of the catalysts (the reforming catalyst, the shift catalyst, and the selective oxidation catalyst) in the hydrogen generator main body 30 without using the inactive gas, such as nitrogen.

From the foregoing explanation, many modifications and other embodiments of the present invention are obvious to one skilled in the art. Therefore, the foregoing explanation should be interpreted only as an example, and is provided for the purpose of teaching the best mode for carrying out the present invention to one skilled in the art. The structures and/or functional details may be substantially modified within the spirit of the present invention.

Industrial Applicability

The present invention is useful for the hydrogen generator which needs to quickly terminate the stop operation while suppressing the decrease in the activities of the catalysts in the hydrogen generator (reformer) when stopping the hydrogen generator, and the fuel cell power generating system including the hydrogen generator.

The invention claimed is:

1. A method for stopping a hydrogen generator, the method comprising steps of:
   (a) stopping supplying a raw material to a reformer configured to generate a hydrogen-containing gas by a reforming reaction between the raw material and water;
   (b) continuing to supply the water to the reformer even after the step (a);
   (c) combusting a gas, supplied from the reformer in the step (b), in a heater configured to heat the reformer;
   (d) stopping supplying the water to the reformer in a case where a combustion detector configured to detect a combustion state of the heater detects extinction of flame;
   (e) detecting a temperature of a reforming catalyst of the reformer; and
   (f) supplying the raw material to the reformer in a case where a temperature equal to or lower than a reference temperature is detected in the step (e).

2. The method according to claim 1, wherein the step (d) includes steps of:
   (d1) stopping supplying the water to the reformer in a case where the combustion detector detects the extinction of flame;
   (d2) causing a raw material supplier to start operating to start supplying the raw material to the reformer; and (d3) causing the raw material supplier to stop operating to stop supplying the raw material to the reformer.

3. The method according to claim 1, wherein:
the hydrogen generator includes a hydrogen-containing gas supplying passage through which the hydrogen-containing gas is supplied from the hydrogen generator to an outside of the hydrogen generator and a sealing device configured to seal the hydrogen-containing gas supplying passage;
the step (d) includes a step (d4) of activating the sealing device to seal the hydrogen-containing gas supplying passage; and
the step (f) includes a step (f1) of activating the sealing device to open the hydrogen-containing gas supplying passage before the raw material is supplied to the reformer.

4. The method according to claim 1, wherein the reference temperature is predetermined based on a temperature at which deposition of carbon from the raw material on the reforming catalyst does not occur.

5. The method according to claim 1, wherein the reforming catalyst is a catalyst containing Ni.

6. A method for stopping a fuel cell power generating system, the method comprising steps of:
(a1) stopping electric power generation of a fuel cell;
(a) stopping supplying a raw material to a reformer configured to generate a hydrogen-containing gas by a reforming reaction between the raw material and water;
(b) continuing to supply the water to the reformer even after the step (a);
(c) combusting a gas, supplied from the reformer in the step (b), in a heater configured to heat the reformer;
(d) stopping supplying the water to the reformer in a case where a combustion detector configured to detect a combustion state of the heater detects extinction of flame;
(e) detecting a temperature of a reforming catalyst of the reformer; and
(f) supplying the raw material to the reformer in a case where a temperature equal to or lower than a reference temperature is detected in the step (e).

* * * * *